United States Patent
Moss

(10) Patent No.: US 6,700,936 B1
(45) Date of Patent: Mar. 2, 2004

(54) MANY-CARRIER TRANSMISSION SYSTEM AND A RECEIVER THEREFOR

(75) Inventor: Peter Neil Moss, West Drayton (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/432,255

(22) Filed: Nov. 2, 1999

Related U.S. Application Data

(63) Continuation-in-part of application No. PCT/GB98/01299, filed on May 5, 1998.

(51) Int. Cl.$^7$ .............................. H04B 1/38; H04L 5/16
(52) U.S. Cl. .................... 375/260; 375/222; 370/210
(58) Field of Search ................... 375/260, 222; 370/19, 200, 464, 329

(56) References Cited

U.S. PATENT DOCUMENTS

| | | | |
|---|---|---|---|
| 4,785,447 A | * 11/1988 | Ichiyoshi | ............... 370/210 |
| 5,247,515 A | 9/1993 | White | |
| 5,357,502 A | 10/1994 | Castelain et al. | |
| 5,497,398 A | * 3/1996 | Tzannes et al. | ............... 375/260 |
| 5,774,500 A | * 6/1998 | Zogakis et al. | ............... 375/261 |
| 5,809,069 A | * 9/1998 | Polley et al. | ............... 375/222 |
| 6,088,327 A | * 7/2000 | Muschallik et al. | ............... 370/210 |
| 6,456,649 B1 | * 9/2002 | Isaksson et al. | ............... 375/222 |

FOREIGN PATENT DOCUMENTS

| | | |
|---|---|---|
| EP | 0641096 A1 | 8/1994 |
| EP | 0641096 A1 | 3/1995 |
| EP | 0704986 A2 | 4/1996 |
| GB | 2304504 | 3/1970 |
| WO | WO96/41458 | 12/1996 |
| WO | WO97/07620 | 2/1997 |

OTHER PUBLICATIONS

Claus Muschalik, Improving an OFDM Reception Using an Adaptive Nyquist Windowing, Jun. 10, 1996, IEEE Transactions on Consumer Electronics, vol. 42, No. 3, pp. 259–269.

* cited by examiner

*Primary Examiner*—Stephen Chin
*Assistant Examiner*—Lawrence Williams
(74) *Attorney, Agent, or Firm*—Wolf, Greenfield & Sacks, P.C.

(57) ABSTRACT

A digital audio broadcasting (DAB) receiver designed for receiving a signal with 1536 active carriers generated by an inverse fast Fourier transform (FFT) with 2048 points, includes the usual RF stage (14), an IF filter (20), and a demodulator (22) providing baseband I and Q signals. This is followed by an anti-aliasing filter (28), a sampler (30), and an FFT (32). The FFT is a 4096-point FFT, and is thus twice as long as required, and gathers twice as many points during each symbol period. However this is found to substantially simplify the construction of the IF filter (20) and, more particularly, the anti-aliasing filter (28). For use with real signals rather than quadrature demodulated signals, an 8192-point FFT is employed.

34 Claims, 7 Drawing Sheets

MANY-CARRIER TRANSMISSION SYSTEM AND A RECEIVER THEREFOR

CROSS-REFERENCE TO RELATED APPLICATION

This application is a continuation-in-part of my International Patent Application No. PCT/GB98/01299, publication No. WO98/51049, with International filing date May 5, 1998.

BACKGROUND OF THE INVENTION

This invention relates to receivers for many-carrier signals, for example OFDM (orthogonal frequency-division multiplex) signals, such as used in digital audio broadcasting (DAB) or digital sound broadcasting, and also in digital television.

The digital audio broadcasting system used in the United Kingdom, now known as mode 1 DAB, requires seven DAB ensembles (channels) each occupying 1.536 MHz within the overall frequency range 217.5 MHz to 230 MHz, a total bandwidth of only 12.5 MHz. The spacing between ensemble centres is 1712 KHz, of which 1536 kHz is taken up by the signal, so that the spacing between the top of one ensemble and the bottom of the next is only 176 kHz. The signal bandwidth of 1536 kHz arises from the use of 1536 separate carriers spaced at spacings of 1 kHz. The number 1536 is chosen as three-quarters of 2048, which equals 2 to the power of eleven, that being the minimum power of 2 which is greater than 1536.

A DAB receiver must be able to receive the desired DAB ensemble to which it is tuned in the presence of a number of interfering DAB signals occupying the adjacent spectrum. Of the adjacent signals, it is the nearest neighbour which is most difficult to reject because of the high ratio of signal bandwidth to edge spacing; the edge spacing is less than one-eighth of the signal bandwidth.

A typical DAB receiver of this type is shown in schematic block diagram form in FIG. 1 of the drawings. The receiver 100 has an antenna 112 feeding a radio frequency (RF) stage shown as an RF amplifier 114. The output of the RF amplifier is applied to a mixer 116 which receives a first local oscillator signal LO1 at a terminal 118. The mixer reduces the frequency of the received signal, typically at around 225 MHz, to an intermediate frequency of typically about 36 MHz. The output of the mixer 116 is applied to an IF bandpass filter 120 which passes the desired intermediate frequency in the region of 36 MHz. The output of the IF filter 120 is then applied to an I/Q demodulator circuit 122, which receives a second local oscillator signal LO2 at a terminal 124. The I/Q demodulator circuit reduces the signals to baseband frequency and also separates the in-phase (I) and quadrature phase (Q) components of the signal. The output 126 of the I/Q demodulator thus in fact comprises two signals, as indicated on FIG. 1, and the subsequent circuitry is duplicated for the two signals, as is well known.

The output 126 of the I/Q demodulator 122 is applied to an anti-alias bandpass filter 128, the characteristics of which are described in more detail below, and from the anti-alias filter 128 are applied to a sampler or analog-to-digital converter 130. The sampler 130 operates at 2.048 Ms/s (mega-samples per second), which is of course the same as the sample rate of the digital signals which were used to form the transmitted signal at the transmitter. In the sampler 130 the signals are now converted from analog form to digital form, and are then applied to a fast Fourier transform (FFT) circuit 132. The FFT generates a signal in the form of a sequence or series of symbol periods. The FFT has 2048 points which corresponds to the theoretical number of carriers with a sampler operating at 2.048 Ms/s, a carrier spacing of 1 kHz, and an active symbol period of 1 ms. In fact as noted above, only 1536 carriers are used, the remainder having a theoretical amplitude of zero.

To achieve this places considerable demands on the filter 128. This filter should have a pass-band extending to ±768 kHz (half of 1536 kHz) but a cut-off frequency of ±1024 kHz (half of 2048 kHz). This is a sharp cut-off and is difficult to achieve.

The output 134 of the FFT is a time-based signal which is then processed using conventional receiver circuitry (not shown).

The circuit of FIG. 1 will be known to those skilled in the art, and further description thereof is not necessary.

Likewise, a corresponding transmitter will be known to those skilled in the art, and includes a 2048-point inverse FFT operating in the digital domain corresponding to the FFT 132 at the receiver. The inverse FFT receives a conventional time-based signal and converts it into a many-carrier signal for transmission.

FIG. 2 is a spectrum diagram showing three adjacent ensembles in the frequency spectrum. The numerical values are those appropriate to the DAB system described above, and are referred to the centre frequency of the central ensemble E which is taken to be zero. One ensemble E+1 is shown above this with positive values and another ensemble E−1 is shown below it with negative values. The values are in kilohertz, but as the individual carriers are spaced by 1 kHz, they can equally be treated as a count of carriers. The amplitudes of the signals shown are purely arbitrary; they are shown for convenience of illustration with a slight peak at the centre of each ensemble but in theory the amplitudes should be flat.

It will be seen that each ensemble extends over 1536 carriers, and that the spacing between corresponding points on the ensembles is 1712 carriers.

FIG. 2 also shows, for the central ensemble, the positions where the sampling frequency and the inverse appear. These fall at ±2048 carriers. The values of half the sampling frequency, fs/2, which fall at ±1024 carriers, are also shown. The value of half the sampling frequency is, as is well known, the Nyquist limit. Frequencies which appear above half the sampling frequency can not be correctly represented by the sampling process.

These frequencies above half the sampling frequency, when subjected to sampling, give rise to spurious components in the sampled signal known as aliased components. The aliased components are commonly thought of as through the signals in the range fs/2 to fs were "reflected" about the frequency fs/2. Thus, a frequency which is a g Hz below the sampling frequency fs, that is a signal of frequency (fs−g) Hz, gives rise to an alias component of frequency of g Hz. This is correct for basebands signals, but for signals above baseband, correctly what happens is that the signals above fs/2 are translated downwards by a frequency shift equal to the sampling frequency fs. Such shift occurs in fact for all integral multiples of the sampling frequency, but only the first and most powerful need be considered in practice.

This is illustrated in FIG. 3, which shows just the central ensemble E of FIG. 2 and the ensemble E+1 above it. It also shows the aliased components which arise by down-shifting the upper ensemble E+1 by the sampling frequency. Those frequencies which arise in the range from above the Nyquist frequency, or half the sampling frequency, namely 1024 kHz, up to the top of the upper ensemble E+1, namely 2480 kHz, are moved downwards by 2048 kHz. The aliased components E−1 now span the frequency range +1024 to +432. Of these the frequencies in the range of −768 to +432 fall within the band of the wanted ensemble E. These can not be rejected by simple frequency-selective filtering. The shifted frequencies are marked in the figure by cross-hatching.

The FFT circuit 132 expects only 1536 carriers out of a possible 2048, and thus inherently rejects energy in the frequency range 768 kHz to 1280 kHz. This upper limit equals the sampling frequency 2048 kHz minus the expected upper carrier frequency limit of 768 kHz. Within the wanted band, this includes the rejection regions marked R on FIG. 3.

We have thus appreciated that to cut out the interference components requires strong IF and anti-alias filtering in the filters 120 and 128 of FIG. 1, in order to reject the adjacent channel energy from ensemble E+1 before it reaches the analog-to-digital converter or sampler 130. To produce a sufficiently sharp cut-off may require for example a surface acoustic wave (SAW) filter for use as the filter 128. Such filters are expensive and lossy and may result in the partial loss of a number of carriers located towards the edges of the ensemble. Although the DAB transmission is very robust, nevertheless degrading the signal in this way may reduce the system margins available to combat other sources of degradation, e.g. multipath distortion or channel noise. Other types of filter may introduce less loss of signal but can introduce considerable group delay ripple into the signal. In summary, the filter requirements are quite difficult to meet without simultaneously adversely affecting the wanted signal. This problem arises independently with the IF filter 120 and with the anti-aliasing filter 128, though primarily with the latter.

This problem arises in the analog processing due to the difficulty of making adequately effective filters. It might therefore be thought that the problem could be solved by constructing the filter 128 in the digital domain rather than in the analog part of the circuit. That is to say, the filter 128 (or at least the greater part of its functionality) would be placed after the sampler 130, instead of ahead of it in the signal processing chain. This would of course require the use of a higher sampling rate than 2.048 Ms/s and a rate such as 4.096 Ms/s could conveniently be chosen. Subsequent to the filter, a downsampler would be included in order to reduce the sample rate to the value of 2.048 Ms/s which can be accepted by the FFT device 132.

While such an arrangement, using a digital filter, should produce theoretically improved rejection of the interfering signal, we have appreciated that it necessarily increases the signal processing requirements by a considerable amount.

It has been proposed by Muschallik, C., in "Improving an OFDM Reception using an Adaptive Nyquist Windowing", IEEE Transactions on Consumer Electronics, Vol. 42, No. 3, August 1996, pages 259–269, (see also International Patent Application WO96/41458) to improve the sensitivity to frequency errors in an OFDM receiver by using a guard interval which is equal in length to the "useful" part of the symbol period, instead of being only one-quarter as long or less, as is generally considered. The receiver FFT is then of double the usual length and uses the samples in the guard interval as well as those in the useful part of the symbol period. This increases the carrier to noise level by 3 dB. The sample rate is however unchanged.

United Kingdom Patent Specification GB-A-2,304,504 and U.S. Pat. No. 5,357,502 similarly propose to increase the length of the FFT, so as to accommodate more of the received signal.

SUMMARY OF THE INVENTION

The invention in its various aspects is defined in the independent claims below to which reference should now be made. Advantageous features of the invention are set forth in the appendant claims.

A first embodiment of the invention is described in more detail below, and takes the form of a DAB receiver designed for receiving a many-carrier signal with 1536 activate carriers as generated by an inverse fast Fourier transform (FFT) with 2048 points. The receiver has the usual RF stage, an IF filter and a demodulator, followed for each of the complex baseband I and Q signals by an anti-aliasing filter, a sampler, and an FFT device. The FFT is a 4096-point FFT, and is thus twice as long as required, and gathers twice as many points during each active symbol period. That is, the sampling rate is doubled. However, we have found that this enables the construction of the IF filter and, more particularly, the anti-aliasing filter, to be substantially simplified.

A second embodiment is designed for use in a receiver where the processing takes place on real signals rather than quadrature demodulated signals. In this case the FFT is a 8192-point FFT, and the signal is reduced to a low IF frequency. "Low" here means less than a value of the order of the channel bandwidth, or at least less than a single-digit multiple of, up to ten times, the channel bandwidth.

BRIEF DESCRIPTION OF THE DRAWINGS

The invention will be described in more detail by way of example with reference to the accompanying drawings, in which.

DETAILED DESCRIPTION OF THE PREFERRED EMBODIMENTS

First Embodiment

A first embodiment of the invention will now be described by way of example, in the form of a DAB receiver which can be used to receive the same signal as is received by the prior art receiver of FIG. 1. The receiver embodying the invention is thus completely compatible with the already-proposed transmission system in that it does not require any alterations at the transmitter.

Figure 4:
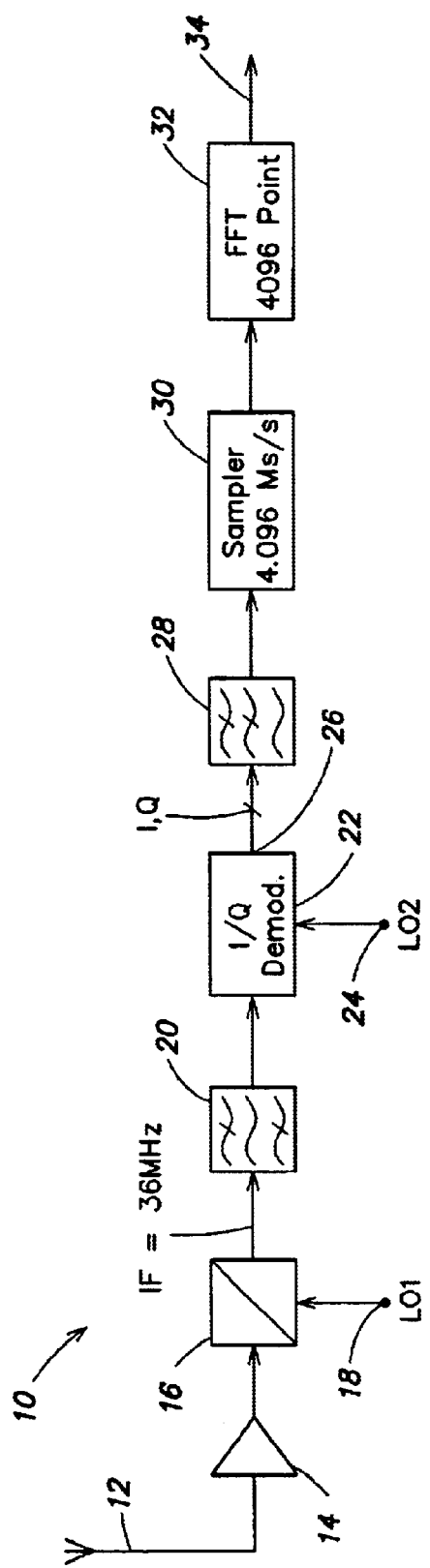
FIG. 4 is a block schematic diagram of the relevant part of a first DAB receiver embodying the present invention.

The DAB receiver 10 embodying the invention is shown in block schematic form in FIG. 4. An antenna 12 feeds a radio frequency (RF) stage shown as an RF amplifier 14. The output of the RF amplifier is applied to a mixer 16, which receives a first local oscillator signal LO1 at a terminal 18. The mixer 16 reduces the frequency of the received signal, typically at a frequency of around 225 MHz, to an intermediate frequency of typically about 36 MHz. The output of the mixer 16 is applied to an IF bandpass filter 20 which passes the desired intermediate frequency in the region of 36 MHz. The output of the IF filter 20 is then applied to an I/Q demodulator circuit 12, which receives a second local oscillator signal LO2 at a terminal 24. The I/Q demodulator circuit reduces the signals to baseband frequency and also separates the in-phase (I) and quadrature-phase (Q) complex components of the signal. The output 26 of the I/Q demodulator thus in fact comprises two signals, as indicated on FIG. 4, and the subsequent circuitry is duplicated for the two signals, as with the system of FIG. 1. Each output 26 of the I/Q demodulator 22 is applied to an anti-alias bandpass filter 28, the characteristics of which are described in more detail below, and from the anti-alias filter 28 is applied to a sampler or analog-to-digital converter 30.

Figure 1:
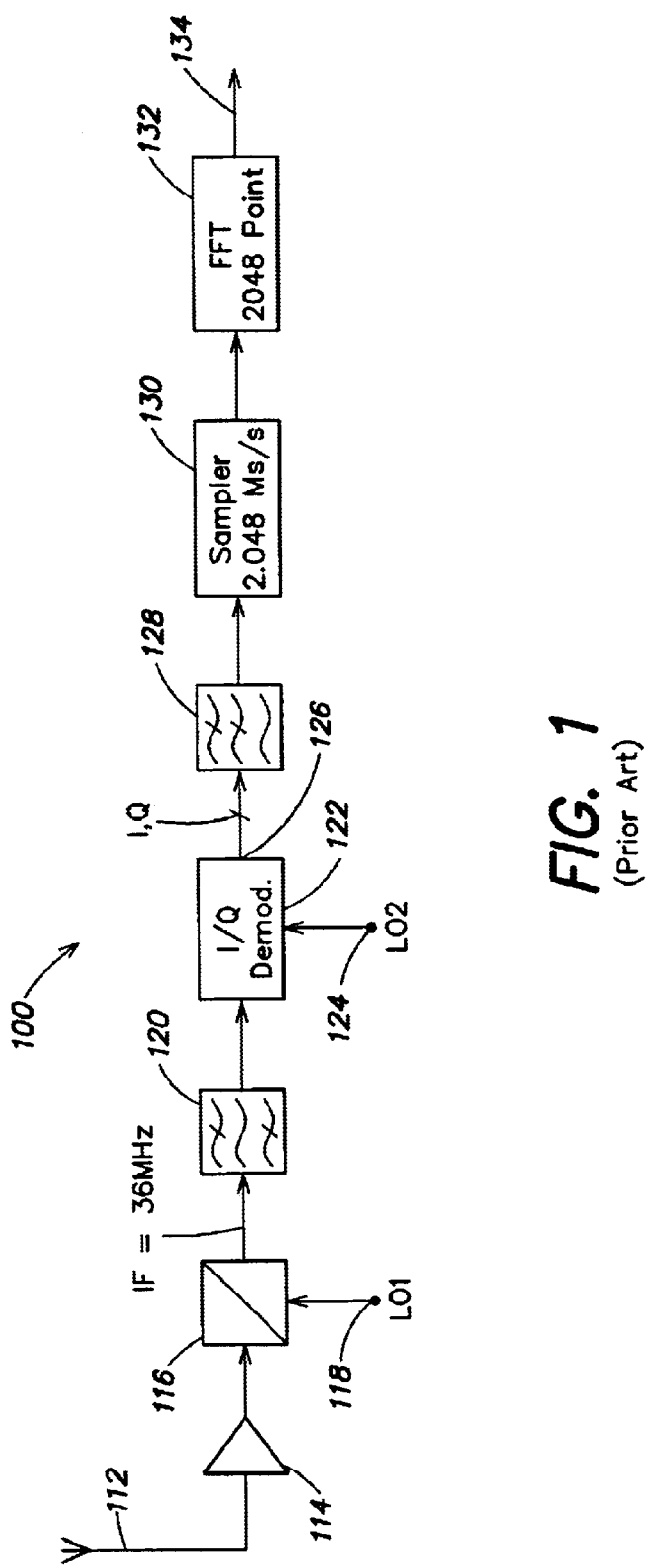
FIG. 1 (described above) is a block schematic diagram of the relevant part of a previously-proposed DAB receiver.

The sampler 30 in this case operates at 4.096 Ms/s, rather than at 2.048 Ms/s as in the system of FIG. 1. In the sampler 30 the signals are converted from analog form to digital form, and are then applied to a fast Fourier transform (FFT) circuit 32. The FFT has 4096 points rather than the 2048 points of the FFT 143 in the system of FIG. 1. The output 34 of the FFT is a time-based signal which is then processed using conventional receiver circuitry (not shown).

Thus the FFT is changed compared with the system of FIG. 1, rather than trying to improve the filter 128 directly. This naturally requires a 4096 Ms/s sampler, but has the advantage that the IF filter 20 and the anti-alias filter 28 do not have to have such precise characteristics as the corresponding components in FIG. 1. The IF filter can be slightly less narrow as compared to FIG. 1, and thus can be of simpler construction. The anti-alias filter 28 still has a pass-band of 768 kHz, but only has to cut-off at 2048 kHz, rather than at 1024 kHz as with FIG. 1. Thus although the problem has in principle nothing to do with the FFT, we have found that the problem in filter construction can be solved by making changes to the FFT which follows the filter and sampler, rather than by trying to improve the filter itself.

More specifically, as will be described with reference to FIG. 5, the longer 4096-point FFT inherently rejects adjacent channel energy in the frequency range between the wanted ensemble edge of 768 kHz and an upper limit of 3328 kHz. This is much wider than the range 768 kHz to 1280 kHz for the system of FIG. 1. This increase in the inherent rejection bandwidth greatly reduces the receiver filter requirements, allowing gentler filters to be used, which causes less distortion to the wanted signal. Such filtering is also likely to give rise to lower signal loss. This has the desirable consequence that the receiver RF stage can be designed to exhibit better linearity, since less gain is required prior to the IF stage.

The rejection bandwidth arises because the FFT is still designed to extract only 1536 carriers at 1 kHz spacing; the remaining outputs (potentially containing interference) can be ignored by the post-FFT processing.

Thus, by reducing the proportion of wanted carriers to a smaller fraction of the total number of carriers, the operation has been improved. In FIG. 1, the wanted carriers amount in number to three-quarters of the total number of carriers. By doubling the total number of carriers, in FIG. 4 the wanted carriers amount to three-eighths of the total number of carriers. The gap between adjacent interfering ensembles thus goes up from one-quarter to five-eighths of the total number of carriers.

Figure 2:
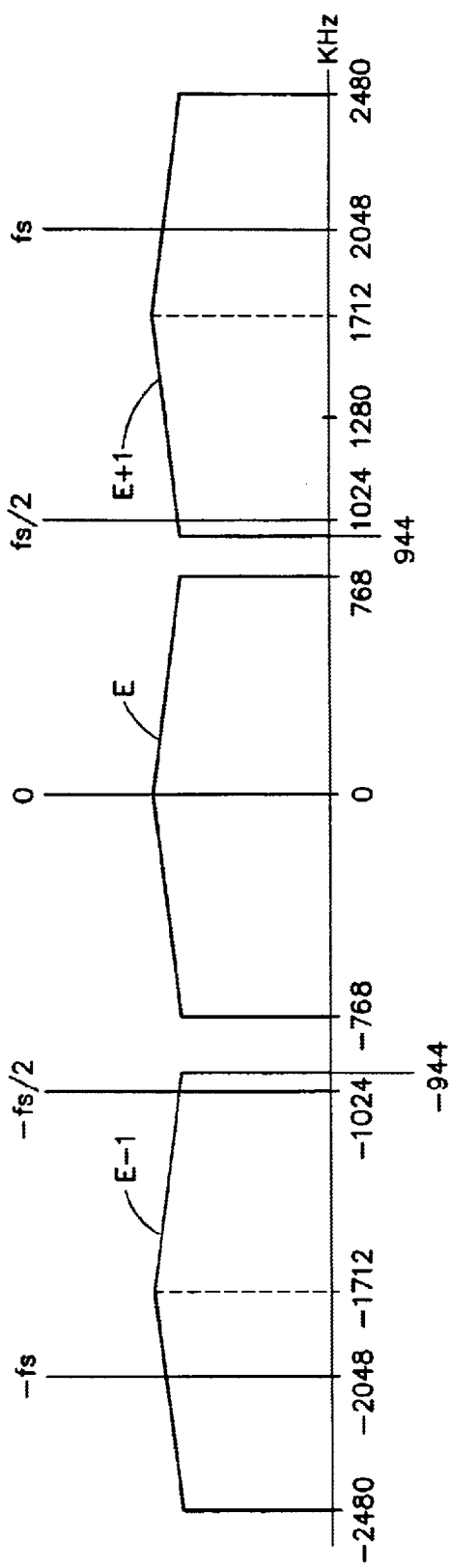
FIG. 2 (described above) is a spectrum diagram showing three adjacent ensembles of a DAB signal.
Figure 5:
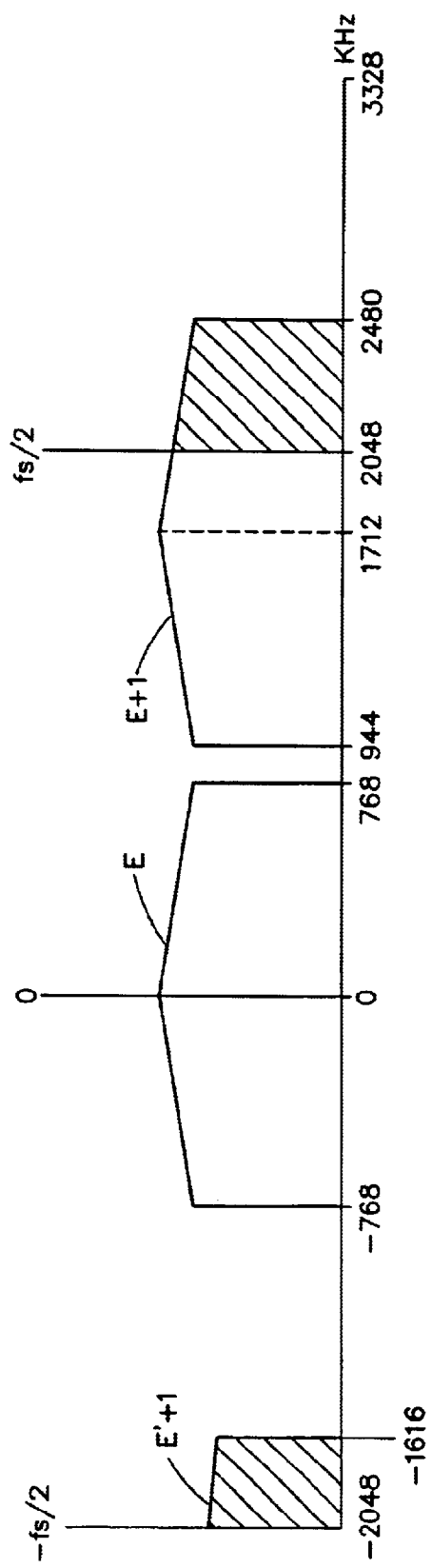
FIG. 5 is a spectrum diagram illustrating how the interference is avoided in accordance with this invention.

FIG. 5 shows a spectrum diagram corresponding to that of FIG. 2, but for the system of FIG. 4 embodying the invention.

Figure 3:
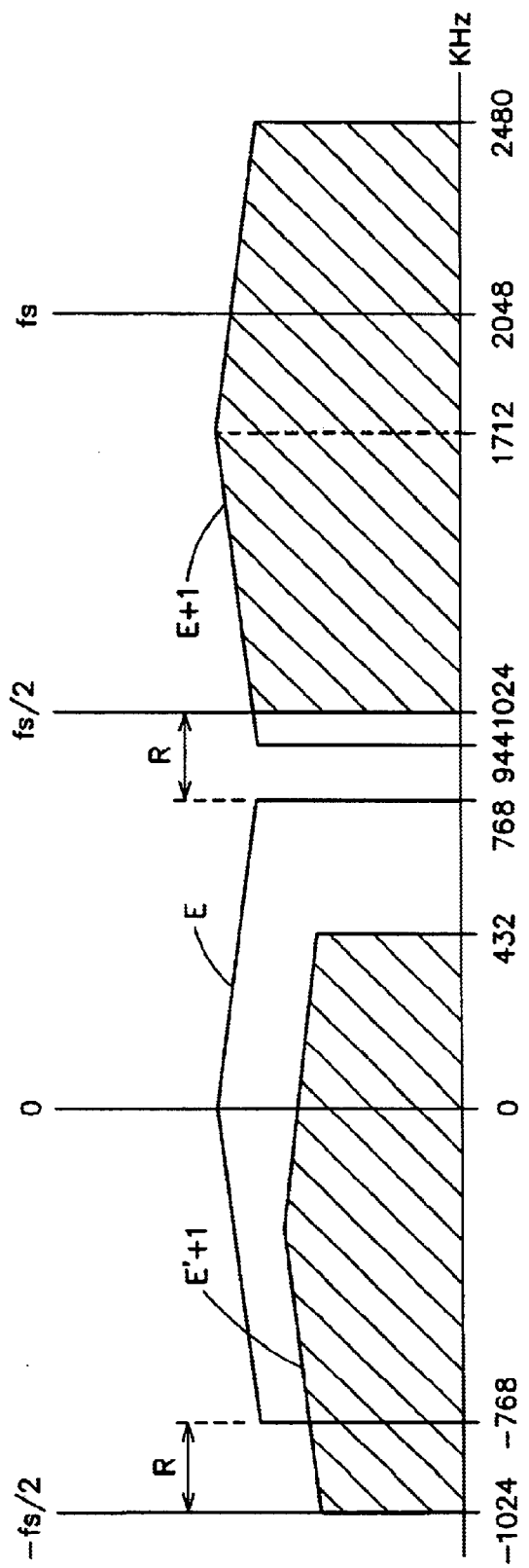
FIG. 3 (described above) is a spectrum diagram illustrating how the interference is generated.

The ensembles E and E+1 are again shown and cover the same frequency ranges as in FIG. 3. In this case, however, the sampling frequency is 4096 kHz rather than 2048 kHz, and so half the sampling frequency is 2048 kHz. Aliasing only occurs with frequencies above 2048 kHz, rather than with frequencies above 1024 kHz. This means that only a small part of the ensemble E+1, namely that lying between 2048 and 2480, is aliased. Furthermore, aliased components no longer lie within the bandwidth +768 to −768 of the wanted ensemble E. Instead, they now fall in the range −1616 to −2048, well outside the bandwidth of ensemble E. In order to provide in-band components it would be necessary for signals in ensemble E+1 to extend above 3328 kHz, which it will be seen, is well above the top of the bandwidth of ensemble E+1.

Thus in the embodiment described, the size of the FFT has been doubled to 4096 points, with a corresponding doubling of the sampling rate. While this is the most convenient value, other values could in theory be chosen, in particular other integral multiples of 2048, itself the minimum power of two which is greater than 1536. This oversampling increases the available processing bandwidth, to allow the IF frequency response (selectivity) to be augmented, while the time period from which the samples are drawn is unchanged.

In general, the system is applicable to a transmission system which has A active carriers out of a possible P carriers, generated by use of a transform having at least P points, where A is an integer and P is an integer which is the minimum power of 2 which is greater than A. In the receiver, the transform is a Q-point transform, where Q is greater than P. As described Q is greater than 2A and is in fact equal to 2P.

The invention has been described as applied to a DAB receiver, but it can be applied to other receivers for many-carrier transmission systems such as those produced by OFDM systems. Another example is digital terrestrial television, where part of the signal is to be transmitted in OFDM form. The numerical values here are of course different, though the principles are the same.

For example, with the so-called 2k television system, the channel spacing is 4.46 kHz (this being the reciprocal of 224 μs). The number of carriers used is 1705 giving a total bandwidth of 1.705×4.46=7.61 MHz. The proposed sample rate is 9.143 MHz and it is proposed to use a 2048 point inverse FFT at the transmitter and a 2048 point FFT at the receiver. In accordance with this invention as applied to an embodiment for reception of such a television signal, the sample rate is preferably raised, in fact doubled, to 18.286 MHz, and a 4096-point FFT is again used. Similar principles are applicable to an 8k television system.

While the invention has been described as using Fourier transforms to produce and process the many-carrier signal, other transforms could in principle be employed, such as the Hadamard transform.

As is seen from the above description, the problem of making the filters in a many-carrier broadcast receiver is overcome not by improving the filter construction, nor by putting the filter in the digital domain, but rather by changing the size of the FFT which is used to one which has greater redundancy. This then enables the constraints on the construction of the filters to be very substantially reduced.

Second Embodiment

In the first embodiment of FIG. 4, as described above, the fast Fourier transform (FFT) processes in the receiver act separately upon complex I and Q signals supplied by the conventional analogue I/Q demodulator 22. Thus the signals are complex signals derived from the incoming real signal by a real-to-complex conversion process, implemented by the I/Q demodulator. The FFT length shown, namely using a 4096 point FFT instead of a 2048 point FFT, is the length which is appropriate to such complex data.

Figure 6:
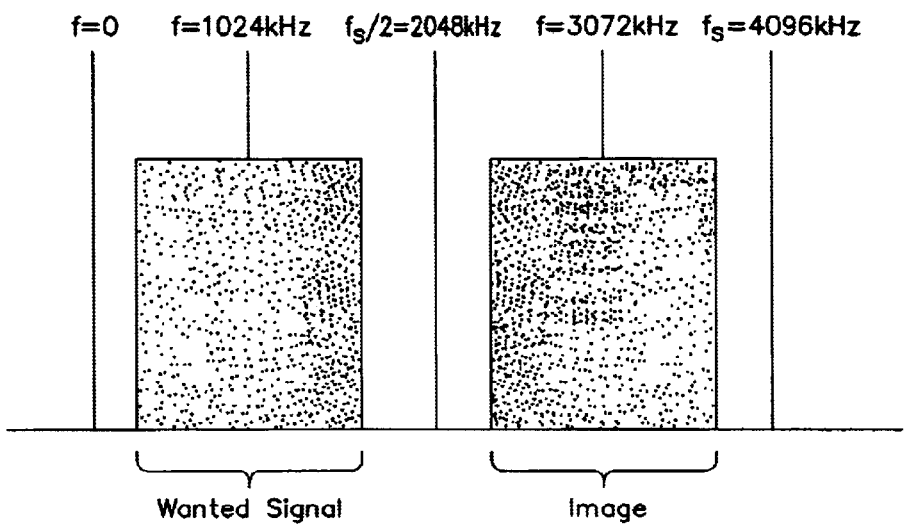
FIG. 6 is a spectrum diagram illustrating the processing of a real signal directly without quadrature demodulation.

It is possible, however, to take a sampled real signal directly, that is without quadrature demodulation, typically at a low IF frequency, and perform an FFT and recover the required modulation data. This is illustrated in the frequency diagram of FIG. 6. A low IF frequency is taken so that the zero frequency lies just below the lower end of the wanted signal. That is, the intermediate frequency (IF) used is a little more than half the bandwidth of the wanted signal. Considering the baseband signal shown in FIG. 2, with a bandwidth of 1536 kHz, an IF frequency of 1024 kHz could be used. As seen in FIG. 6 the wanted signal then extends from 256 kHz to 1792 kHz. To extract the data corresponding to the I and Q components from this single real signal, it is necessary to use an increased sampling frequency which is double the frequency shown in FIG. 2. Thus, as shown in FIG. 6, the sampling frequency $f_s$ is 4096 kHz, and the Nyquist limit of half the sampling frequency $f_s/2$ is 2048 kHz. Also as shown in the figure, an image will be generated by the sampling frequency $f_s/2$ and $f_s$, centred on frequency 3072 kHz.

FIG. 6 thus shows that the sampling rate of 4096 kHz must be used to sample the real (undemodulated) signal if it is to be centred at 1024 kHz and is to retain the same fractional guard band as the complex system of FIGS. 1 and 2. To retain the FFT resolution of 1 kHz, which is necessary to extract the data on the 1 kHz-spaced carriers, an FFT length of 4096 must also be used. This has the advantage that a real-to-complex conversion or quadrature demodulation is avoided, but at the cost of a higher sampling rate and increased FFT length.

Nevertheless the problem described with reference to FIGS. 1 to 3 still remains because the real signal being applied to the FFT now contains twice as much data as each of the I and Q signals of FIG. 1. The spectrum diagram is no better than FIG. 2; the difference is that every numerical value is now doubled. But the need for a sharp frequency-selective filter remains and if anything it is even more difficult to implement.

Figure 7:
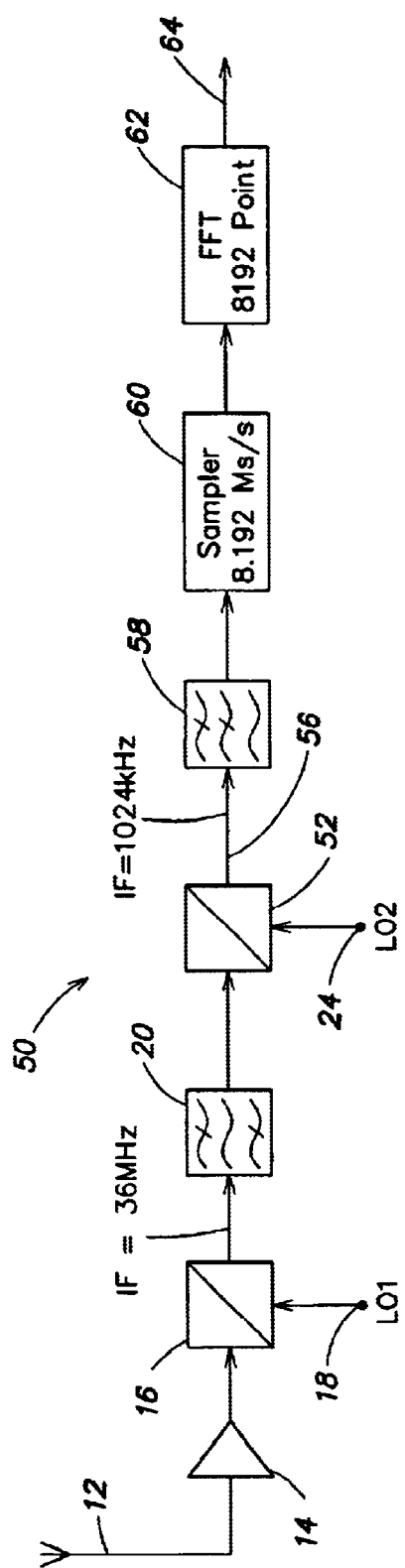
FIG. 7 is a block schematic diagram of the relevant part of a second DAB receiver embodying the present invention.

FIG. 7 is a block diagram of the second embodiment of the invention in which this problem is overcome in an analogous way to the first embodiment. The receiver shown in FIG. 7 has an antenna 12 feeding an RF amplifier 14, a mixer 16 receiving a first local oscillator signal L01 at a terminal 18, and an IF bandpass filter 20, as in FIG. 4. However, instead of the demodulator 22 there is now another mixer 52 which receives a different local oscillator signal L02 at terminal 54 so as to provide an output at 56 which is not at baseband but instead is at a low IF frequency and is still a single real signal. The output of the second mixer 52 is applied to an anti-alias bandpass filter 58, and from the anti-alias filter 58 is applied to a sampler or analogue-to-digital converter 60.

The sampler 60 in this case operates at 8.192 Ms/s rather than at 4.096 Ms/s. In the sampler 60 the signal is converted from analog to digital form, and is then applied to a first Fourier transform circuit 62. The FFT has 8192 points rather than the 2048 points of the FFT of FIG. 1 or the 4096 points of FIG. 4. That is, the FFT has a number of points which is more than twice the minimum power of 2 which is greater than the signal bandwidth. The output 64 of the FFT is a time-based signal which is then processed using conventional DAB receiver circuitry (not shown).

Figure 8:
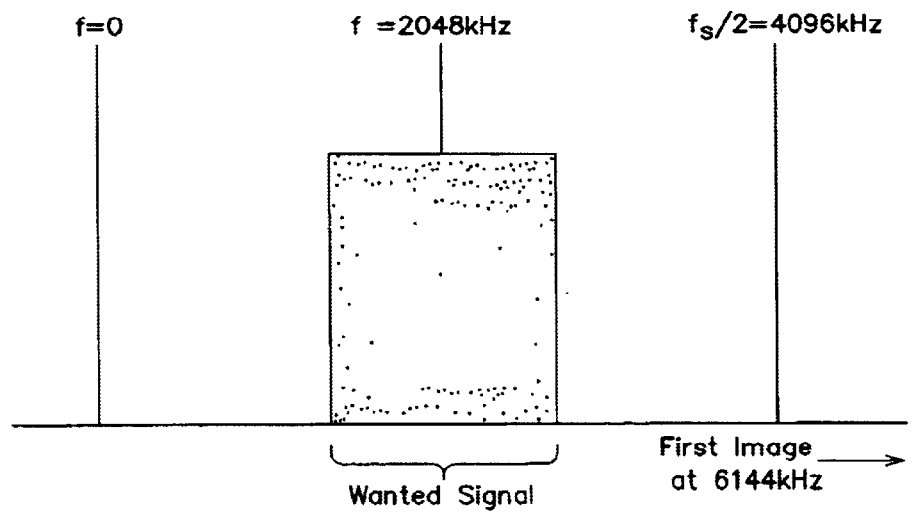
FIG. 8 is a spectrum diagram illustrating how, in the receiver of FIG. 7, the interference is avoided.

The resultant spectrum is as shown in FIG. 8, and the same benefits are gained with this real signal version as for the complex version of the first embodiment. The wanted signal is centred on 2048 kHz, and the first image is at 6144 kHz. The requirements for the filter 58 can therefore relatively easily be met.

It will be seen from the foregoing that in the first embodiment the processing is applied to demodulated complex signal components at baseband frequency, whereas in the second embodiment the processing is applied to a 'real' signal, with combined in-phase and quadrature-phase components, at a low intermediate frequency (IF).

It has been assumed that at the transmitter the inverse FFT will have a number of points which is equal to the minimum power of two which is greater than the number of actual carriers A. In fact, the number of points used in the FFT at the transmitter can be greater than this without affecting the operation of the present invention.

The arrangement described can be modified for use with other transmission systems than those illustrated by way of example. For example, the invention may be applied to the so-called DRM (Digital Radio Mondiale) system, intended for short, medium and long wave broadcasting (below 30 MHz).

Other modifications to the system described by way of example may be made within the scope and spirit of the invention as set forth in the appended claims.

What is claimed is:

1. A many-carrier transmission system, comprising a transmitter which includes inverse transform means for generating from an input signal a many-carrier transmission signal having A active carriers out of a possible P carriers, where A is an integer and P is an integer which is the minimum power of 2 which is greater than A, by use of a transform having at least P points, the transmission signal consisting of a sequence of active symbol periods, and a receiver for receiving the many-carrier signal transmitted by the transmitter, the receiver including:
   means for band-pass filtering and for sampling the received many-carrier signal at a predetermined sample frequency chosen to gather a multiple of P points during one active symbol period, the band-pass filtering and sampling means processing demodulated complex quadrature signals separately; and
   transform means for receiving the filtered and sampled many-carrier signal and for generating a time-based signal therefrom;
   in which the transform means at the receiver operates with a Q-point transform, where Q is an integer greater than P.

2. A many-carrier transmission system according to claim 1, in which Q is greater than twice A.

3. A many-carrier transmission system according to claim 1, in which Q is equal to or greater than twice P.

4. A many-carrier transmission system according to claim 1, in which P is 2048 and Q is a multiple of 2048.

5. A many-carrier transmission system according to claim 1, in which P is 2048 and Q is 4096.

6. A many-carrier transmission system according to claim 1, in which the band-pass filtering and sampling means includes for the band-pass filtering an anti-aliasing filter coupled to receive the received signal, and for the sampling a sampler coupled to receive the output of the anti-aliasing filter and supplying an output to the transform means.

7. A many-carrier transmission system according to claim 1, in which the transform means comprises a Fourier transform device.

8. A many-carrier transmission system, comprising a transmitter which includes inverse transform means for generating from an input signal a many-carrier transmission signal having A active carriers out of a possible P carriers, where A is an integer and P is an integer which is the minimum power of 2 which is greater than A, by use of a transform having at least P points, the transmission signal consisting of a sequence of active symbol periods, and a receiver for receiving the many-carrier signal transmitted by the transmitter, the receiver including:
  means for band-pass filtering and for sampling the received many-carrier signal at a predetermined sample frequency chosen to gather a multiple of P points during one active symbol period, the band-pass filtering and sampling means processing real signals at a low IF frequency; and
  transform means for receiving the filtered and sampled many-carrier signal and for generating a time-based signal therefrom;
  in which the transform means at the receiver operates with a Q-point transform, where Q is an integer greater than twice P.

9. A many-carrier transmission system according to claim 8, in which Q is greater than four times A.

10. A many-carrier transmission system according to claim 8, in which Q is equal to or greater than four times P.

11. A many-carrier transmission system according to claim 8, in which P is 2048 and Q is a multiple of 4096.

12. A many-carrier transmission system according to claim 8, in which P is 2048 and Q is 8192.

13. A many-carrier transmission system according to claim 8, in which the band-pass filtering and sampling means includes for the band-pass filtering an anti-aliasing filter coupled to receive the received signal, and for the sampling a sampler coupled to receive the output of the anti-aliasing filter and supplying an output to the transform means.

14. A many-carrier transmission system according to claim 8, in which the transform means comprises a Fourier transform device.

15. A method of transmitting a many-carrier transmission signal, comprising the steps of generating from an input signal a many-carrier transmission signal having A active carriers out of a possible P carriers, where A is an integer and P is an integer which is the minimum power of 2 which is greater than A, by use of a transform having at least P points, the transmission signal consisting of a sequence of active symbol periods, and transmitting the resultant many-carrier signal, and receiving the many-carrier signal transmitted by the transmitter, the receiving step including band-pass filtering and sampling the received many-carrier signal at a predetermined sample frequency chosen to gather a multiple of P points during one active symbol period, the band-pass filtering and sampling step comprising filtering and sampling demodulated complex quadrature signals separately; and generating by use of a transform a time-based signal from the filtered and sampled many-carrier signal; in which the transform at the receiver operates with a Q-point transform, where Q is an integer greater than P.

16. A method according to claim 15, in which Q is greater than twice A.

17. A method according to claim 15, in which Q is equal to or greater than twice P.

18. A method according to claim 15, in which P is 2048 and Q is a multiple of 2048.

19. A method according to claim 15, in which P is 2048 an Q is 4096.

20. A method according to claim 15, in which the band-pass filtering and sampling step includes for the band-pass filtering the step of anti-alias filtering the received signal, and for the sampling step sampling the anti-alias filtered signal to supply an output to the transform.

21. A method according to claim 15, in which the transform comprises a Fourier transform.

22. A method of transmitting a many-carrier transmission signal, comprising the steps of generating from an input signal a many-carrier transmission signal having A active carriers out of a possible P carriers, where A is an integer and P is an integer which is the minimum power of 2 which is greater than A, by use of a transform having at least P points, the transmission signal consisting of a sequence of active symbol periods, and transmitting the resultant many-carrier signal, and receiving the many-carrier signal transmitted by the transmitter, the receiving step including band-pass filtering and sampling the received many-carrier signal at a predetermined sample frequency chosen to gather a multiple of P points during one active symbol period, the band-pass filtering and sampling step comprising filtering and sampling real signals at a low IF frequency; and generating by use of a transform a time-based signal from the filtered and sampled many-carrier signal; in which the transform at the receiver operates with a Q-point transform, where Q is an integer greater than twice P.

23. A method according to claim 22, in which Q is greater than four times A.

24. A method according to claim 22, in which Q is equal to or greater than four times P.

25. A method according to claim 22, in which P is 2048 and Q is a multiple of 4096.

26. A method according to claim 22, in which P is 2048 and Q is 8192.

27. A method according to claim 22, in which the band-pass filtering and sampling step includes for the band-pass filtering the step of anti-alias filtering the received signal, and for the sampling step sampling the anti-alias filtered signal to supply an output to the transform.

28. A method according to claim 22, in which the transform comprises a Fourier transform.

29. A receiver for receiving a many-carrier signal consisting of a sequence of active symbol periods, the receiver comprising:
  means for band-pass filtering and for sampling a received many-carrier transmitted signal which includes a predetermined number A of active wanted carriers at a predetermined sample frequency chosen to gather a multiple of P points during one active symbol period, where A is an integer and P is an integer which is the minimum power of 2 which is greater than A, the band-pass filtering and sampling means processing demodulated complex quadrature signals separately; and
  transform means for receiving the filtered and sampled many-carrier signal and for generating a time-based signal therefrom; and
  in which the transform means at the receiver operates with a Q-point transform, where Q is an integer greater than twice A.

30. A receiver according to claim 29, in which Q is 4096.

31. A receiver according to claim 29, in which the transform means comprises Fourier transform means.

32. A receiver for receiving a many-carrier signal consisting of a sequence of active symbol periods, the receiver comprising:
- means for band-pass filtering and for sampling a received many-carrier transmitted signal which includes a predetermined number A of active wanted carriers at a predetermined sample frequency chosen to gather a multiple of P points during one active symbol period, where A is an integer and P is an integer which is the minimum power of 2 which is greater than A, the band-pass filtering and sampling means processing real signals at a low IF frequency; and
- transform means for receiving the filtered and sampled many-carrier signal and for generating a time-based signal therefrom; and
- in which the transform means at the receiver operates with a Q-point transform, where Q is an integer greater than four times A.

33. A receiver according to claim 32, in which Q is 8192.

34. A receiver according to claim 32, in which the transform means comprises Fourier transform means.

* * * * *

UNITED STATES PATENT AND TRADEMARK OFFICE
CERTIFICATE OF CORRECTION

PATENT NO. : 6,700,936 B1
DATED : March 2, 2004
INVENTOR(S) : Peter Neil Moss

It is certified that error appears in the above-identified patent and that said Letters Patent is hereby corrected as shown below:

Column 4,
Line 13, delete the word "activate" and insert -- active --;

Column 5,
Line 27, delete the number "143" and insert -- 132 --;

Column 7,
Line 28, should appear as follows -- in the figure, an image will be generated by the sampling between --;
Line 65, delete the word "first" and insert -- fast --;

Column 10,
Line 6, delete the word "an" and insert -- and --.

Signed and Sealed this

Twenty-fourth Day of May, 2005

JON W. DUDAS
*Director of the United States Patent and Trademark Office*